UNITED STATES PATENT OFFICE.

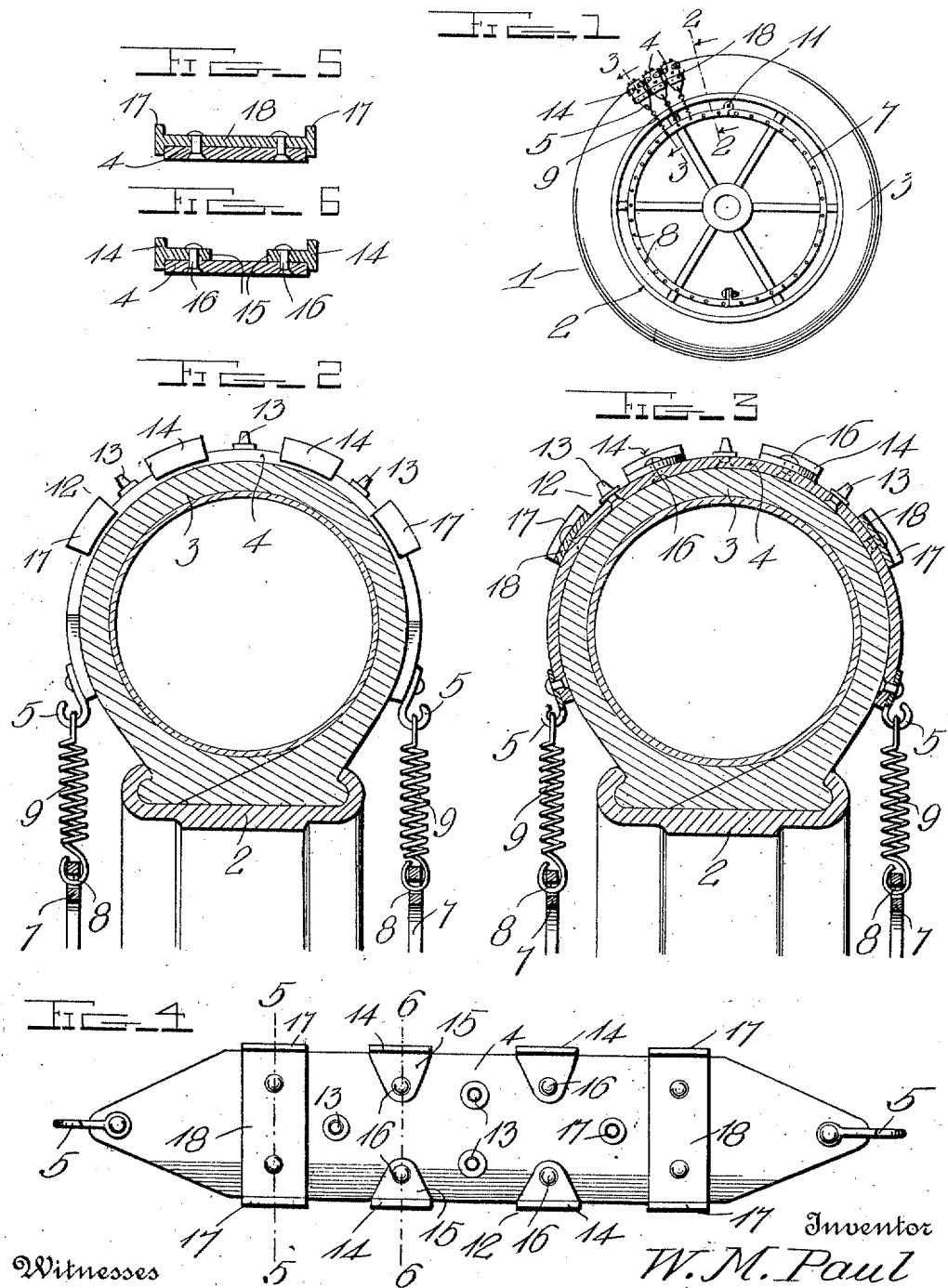

WILLIAM M. PAUL, OF NEW YORK, N. Y.

ANTISKIDDING-ARMOR FOR TIRES.

982,630.
Specification of Letters Patent.
Patented Jan. 24, 1911.

Application filed June 30, 1910. Serial No. 569,771.

*To all whom it may concern:*

Be it known that I, WILLIAM M. PAUL, a citizen of the United States, residing at New York, in the county of New York and State of New York, have invented certain new and useful Improvements in Antiskidding-Armor for Tires; and I do declare the following to be a full, clear, and exact description of the invention, such as will enable others skilled in the art to which it appertains to make and use the same.

This invention relates to anti-skidding armor for pneumatic tires and it consists in the construction and arrangement of parts, as will be hereinafter described and particularly pointed out in the claim.

In the accompanying drawings, Figure 1 is a side elevation of a wheel showing the application of my improved armor; Fig. 2 is a sectional view taken on the line 2—2 of Fig. 1; Fig. 3 is a similar view on the line 3—3 of Fig. 1; Fig. 4 is a plan view of one section of the armor; and Figs. 5 and 6 are detail sections on the lines 5—5 and 6—6 of Fig. 4, respectively.

Similar reference characters indicate corresponding parts throughout the several views.

Referring particularly to the drawings, 1 designates a vehicle wheel of any desired type or size having a rim 2 in which is secured a pneumatic tire 3. In the practical embodiment of my invention, I employ a plurality of tread sections 4 of leather or any suitable material, which are adapted to be bent or shaped about the tire, these tread sections 4 being adapted to lie side by side entirely around the periphery or tread of the tire, as clearly indicated in Fig. 1, the tread sections being independent and separately secured. As herein shown and preferably constructed, the tread sections 4 are tapered at their ends and provided at each end with a suitable hook 5 of metal or other suitable material, which is preferably detachably secured upon the ends of the tread sections by rivets or bolts.

To secure the tread sections 4 is position upon the tread of the tire, and at the same time permit them to freely move to accommodate themselves to all of the movements or depressions of the tire during the travel of the vehicle, I employ a pair of retaining rings 7, in which are provided a plurality of spaced apertures 8 for the reception of one end of the coil springs 9, which are suitably secured at their opposite ends to the hooks 5 carried by the tread sections 4. One of these coil springs is preferably secured at each end of each of the tread sections, and they serve to at all times hold the sections against the periphery of the tire while allowing the leather sections to be depressed with the pneumatic tire when the wheel passes over a stone or other obstacle in the road. It will also be apparent that if any of the tread sections 4 becomes cut or worn by reason of its contact with glass or other sharp objects encountered in the road, the tread sections may be instantly removed by uncoupling the ends of the springs 9 from the hooks 5 upon that particular tread section. Thus the injured tread sections may be immediately removed and replaced by others without disturbing the remaining tread sections upon the tire.

The retaining rings 7 are preferably divided, and, as herein shown, comprise two substantially similar sections which are hingedly connected, as at 11, to each other, while a suitable clamp or locking means is carried by the opposite ends of these sections, to secure or lock the ring sections in position upon the vehicle wheel. Owing to this construction the entire armor may be removed from about the vehicle tire without detaching the separable tread sections, by unlocking or unclamping the retaining rings 6 and swinging the sections upon their hinges until the tread sections and retaining rings may be slipped from the vehicle tire.

In order to prevent excessive wear upon the tread sections 4 and to provide an antiskidding device, whereby the vehicle may obtain a firm hold upon the ground at all times, I preferably secure upon the outer face of each of the tread sections 4, a plurality of spurs or studs 12, which are provided with portions adapted to project radially with relation to the vehicle wheel when the tread sections are in position upon the tire. These spurs or studs 12 are preferably arranged in the following manner: At substantially the central portion of each of the tread sections 4 are provided metallic studs 13 of any desired shape and suitably secured to the leather or like material of the tread section. At each side of the central studs and arranged so that the lower flange of each of the studs engage the sides of the tread sections, are T-shaped spurs 14, the body portion or shank 15 of which is secured to the tread section by means of bolts or rivets 16, while the uppermost flange projects at substantially right angles from the face of the tread section. Spaced from the T-shaped spurs and arranged on each side thereof, are provided I-shaped spurs or studs 17, the body portion or shank 18 of which is riveted or otherwise secured to the tread section, as clearly indicated in Fig. 3, while the lowermost flange of each spur engages the side edges of the tread section, and the uppermost flange projects at substantially right angles from the outer face of the tread section. The lower flanges of the T-shaped spurs 14 and the I-shaped spurs 17 extend to a point slightly above the lower face of the tread sections 4 and do not contact within the periphery or tread of the vehicle tire.

It will be seen that when the armor sections are provided with the gripping devices of the kind described that the T-shaped heads of the devices on adjoining sections will bear one against the other and so prevent the sections from shifting their position and riding up one over the other.

From the foregoing it will be apparent that I have deviced a reinforcing and antiskidding armor for vehicle tires composed of a plurality of separably independent sections, each of which carries a plurality of anti-skidding means and which may be singly or collectively secured about the tire of the vehicle wheel when desired.

From the foregoing description taken in connection with the accompanying drawings, the construction and operation of the invention will be readily understood without requiring a more extended explanation.

Having described my invention, I claim:

In a tire armor, the combination with a flexible strip adapted to be secured transversely across the tire, of a gripping device secured thereto comprising a shank of a length approximately equal to the width of said strip, said shank provided at each end with T-heads whereby when said device is applied to said strip the downwardly directed arms of the T's embrace the edges of the same, and the others, upwardly directed, forming gripping calks.

In testimony whereof I have hereunto set my hand in presence of two subscribing witnesses.

WILLIAM M. PAUL.

Witnesses:
HARRY A. COYBE,
ANTHONY VIGLIETTA.